J. A. GILES.
PAPER BOX MACHINE.
APPLICATION FILED MAY 1, 1912.
1,111,572.
Patented Sept. 22, 1914.
9 SHEETS—SHEET 4.
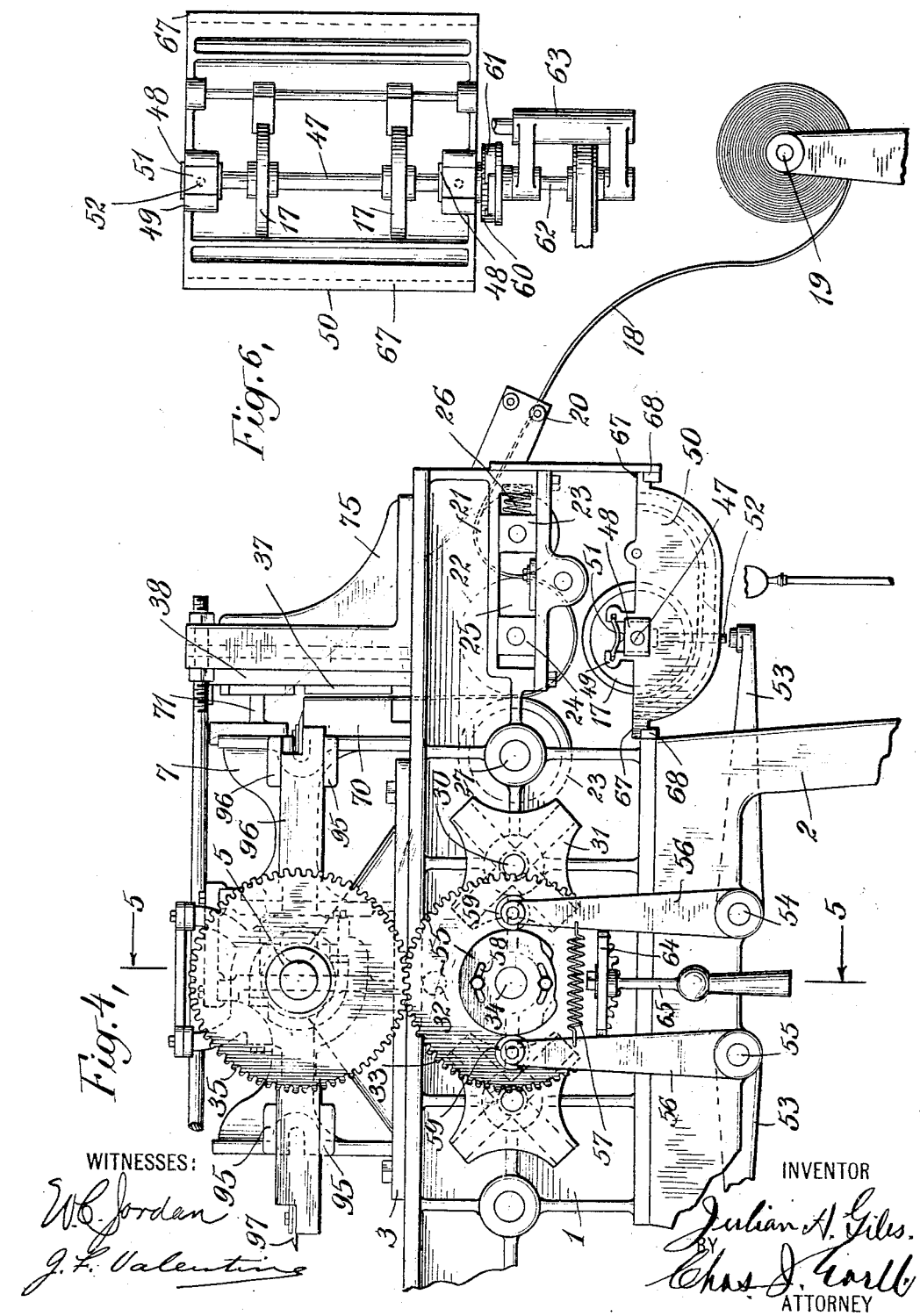

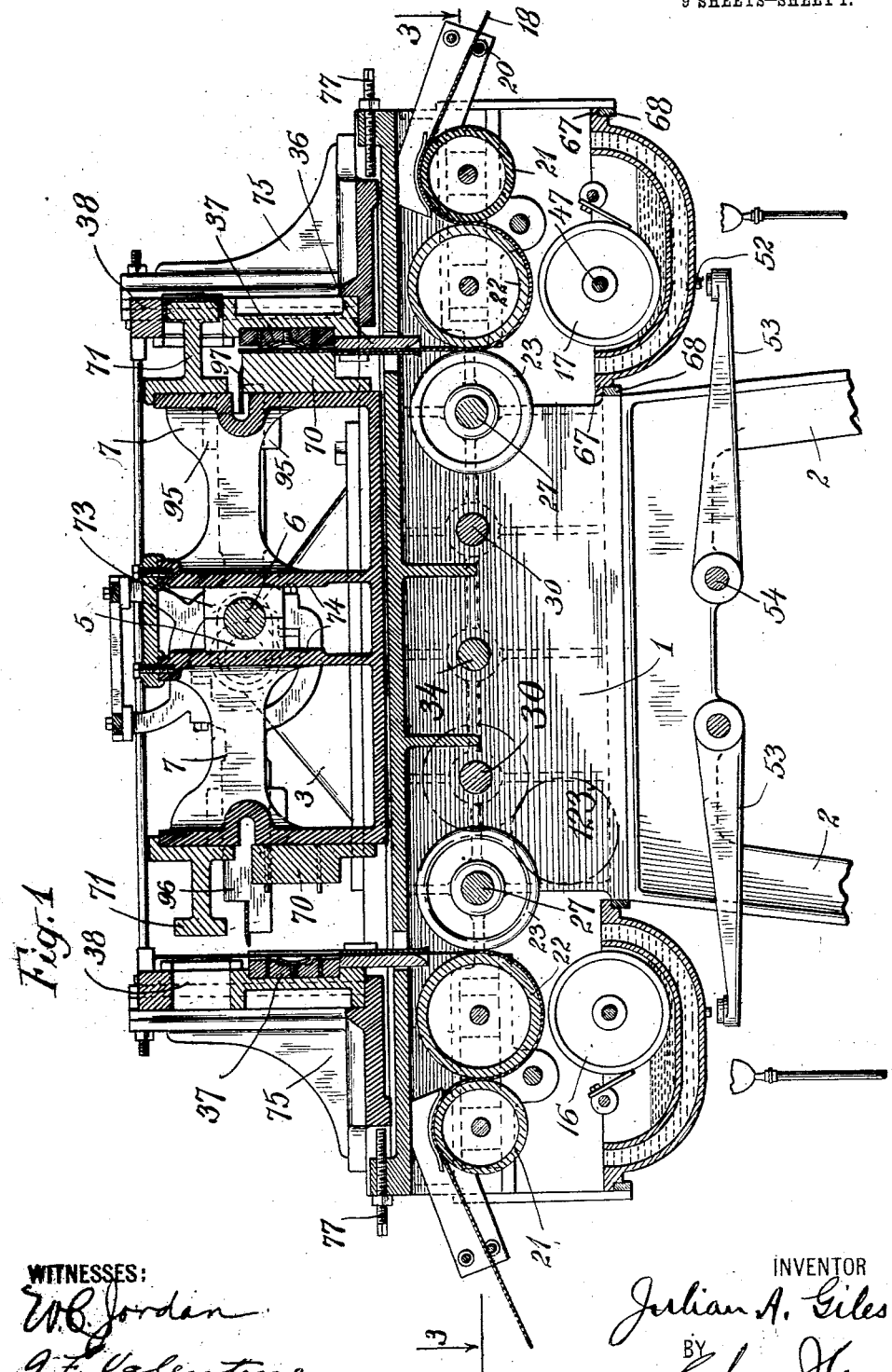

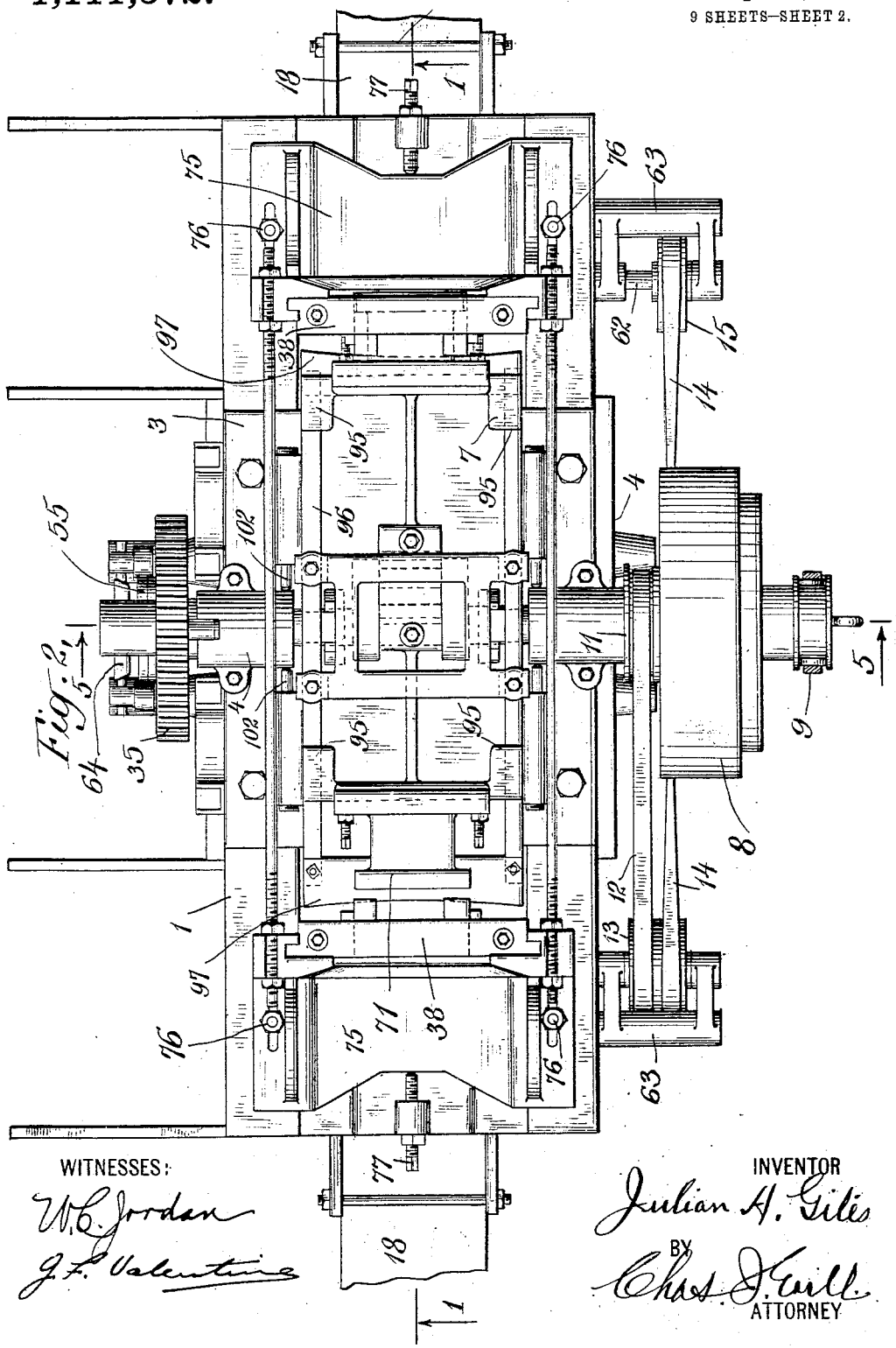

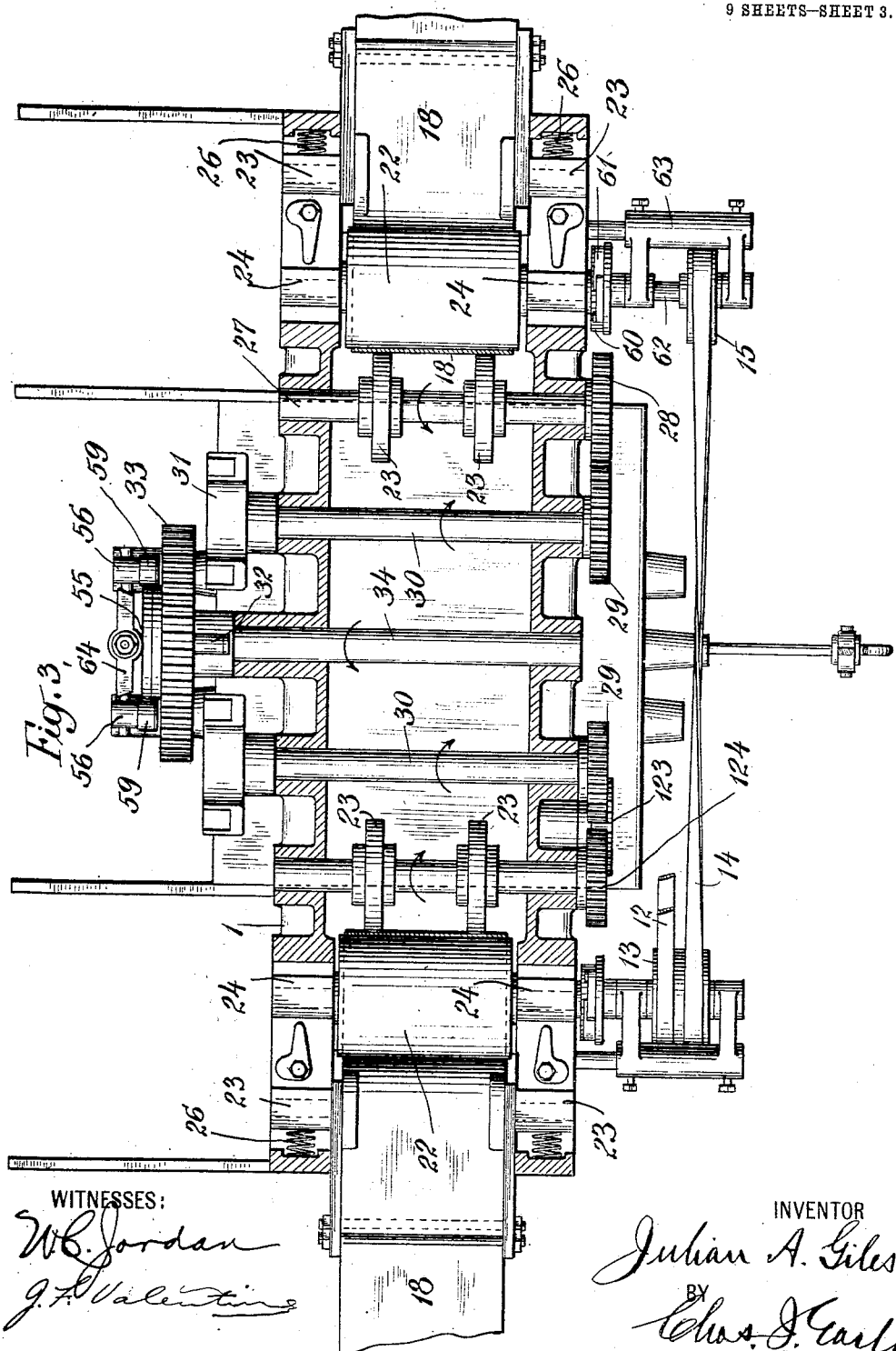

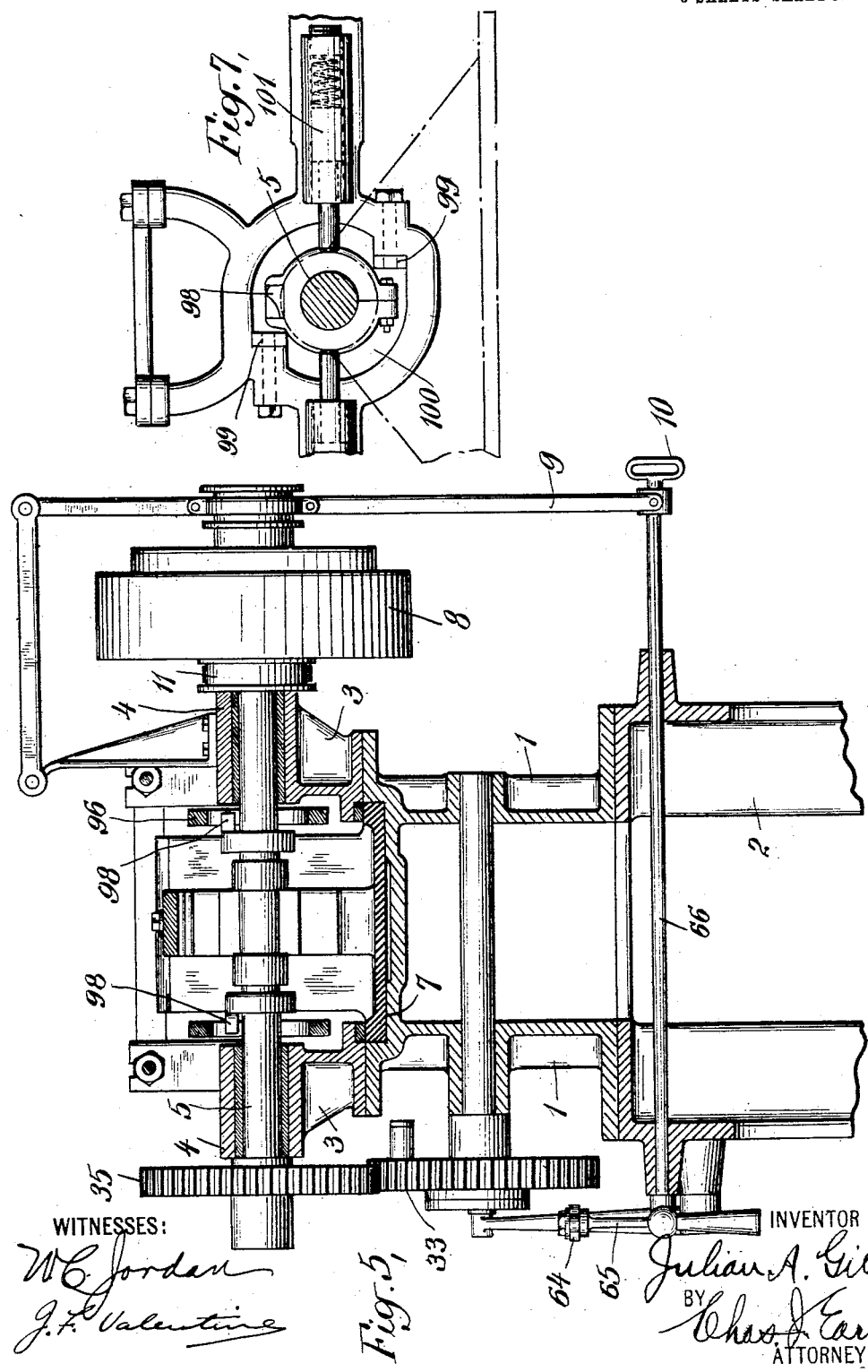

J. A. GILES.
PAPER BOX MACHINE.
APPLICATION FILED MAY 1, 1912.
1,111,572.
Patented Sept. 22, 1914.
9 SHEETS—SHEET 6.
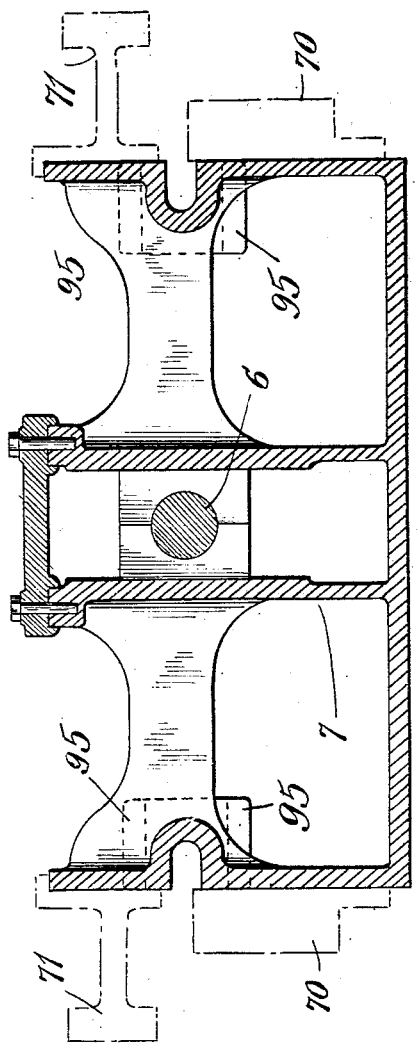
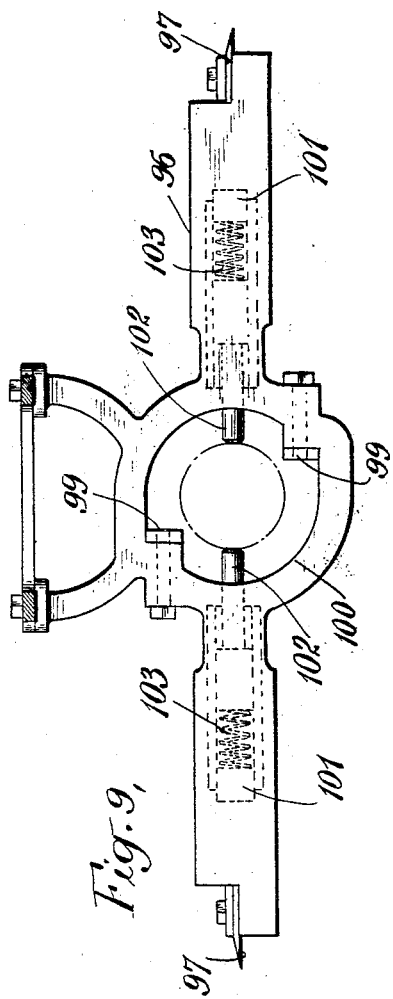

J. A. GILES.
PAPER BOX MACHINE.
APPLICATION FILED MAY 1, 1912.

1,111,572.

Patented Sept. 22, 1914.
9 SHEETS—SHEET 7.

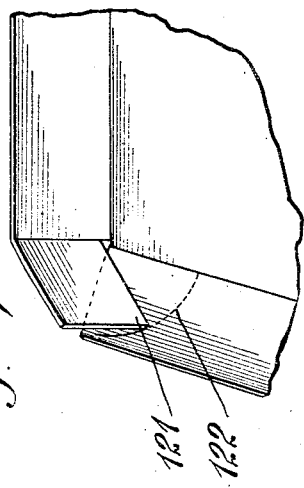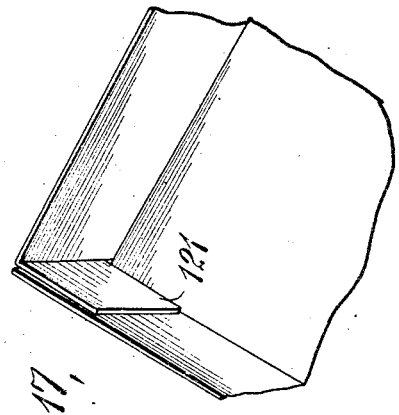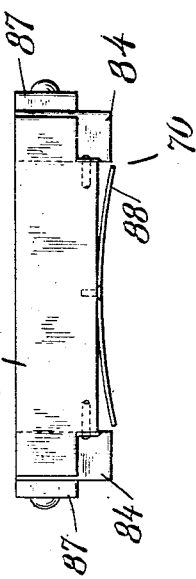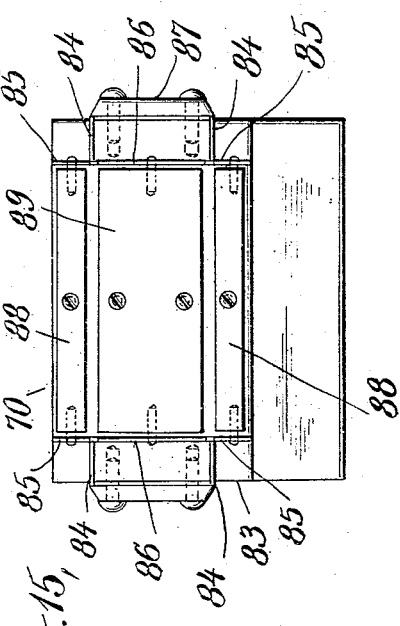

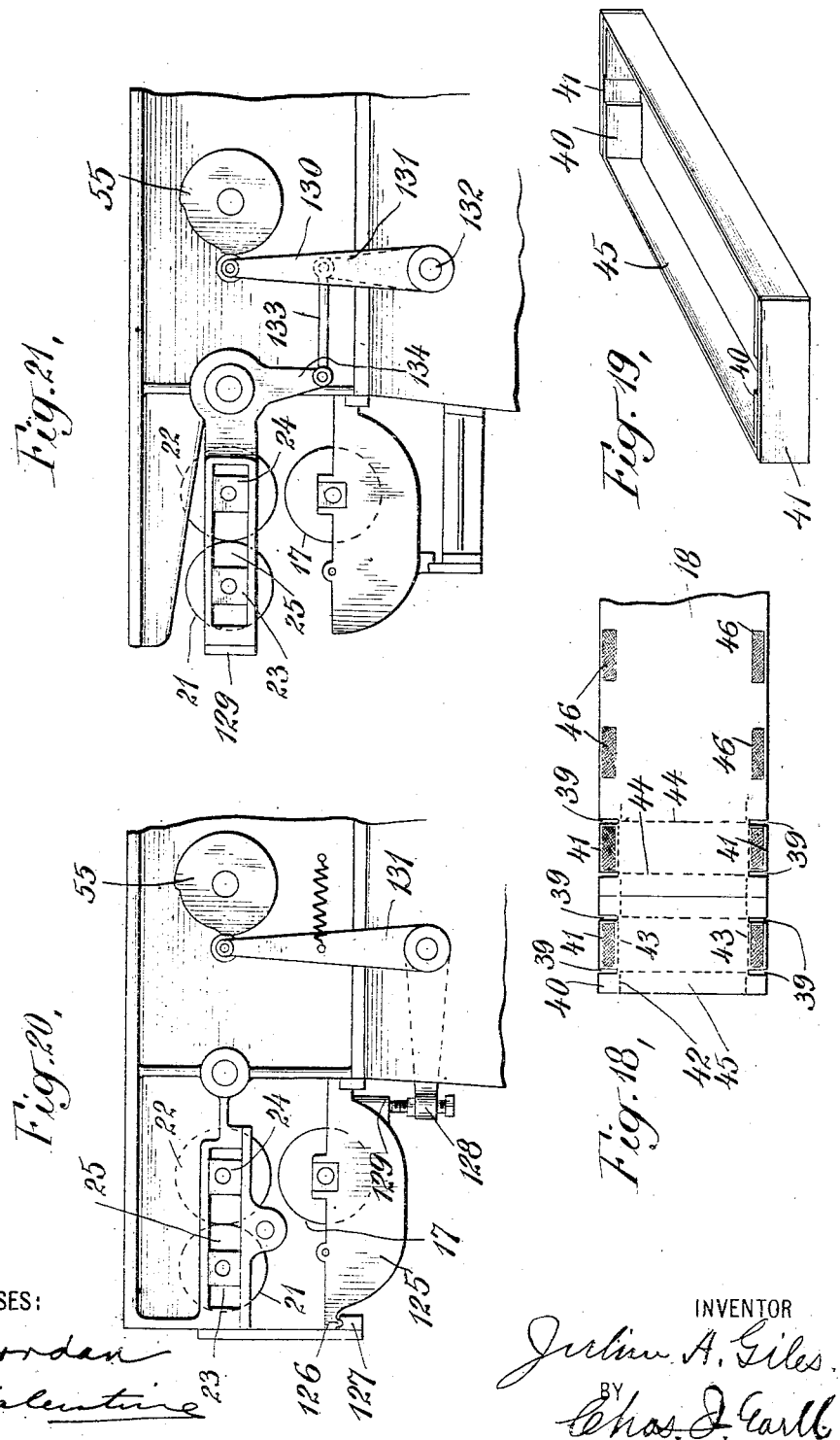

UNITED STATES PATENT OFFICE.

JULIAN A. GILES, OF DERBY, CONNECTICUT, ASSIGNOR TO THE DUPLEX PAPER BOX MACHINE COMPANY, OF NEW HAVEN, CONNECTICUT, A CORPORATION OF CONNECTICUT.

PAPER-BOX MACHINE.

1,111,572.

Specification of Letters Patent. Patented Sept. 22, 1914.

Application filed May 1, 1912. Serial No. 694.317.

*To all whom it may concern:*

Be it known that I, JULIAN A. GILES, a citizen of the United States of America, and resident of Derby, county of New Haven, and State of Connecticut, have invented certain new and useful Improvements in Paper-Box Machines, of which the following is a specification.

My invention relates to box machines, and more particularly to that class of box machines in which paper boxes are made from a continuous web or roll of paper fed into the machine automatically and punched, scored, folded and glued automatically.

The object of my invention is to provide a machine of this class which shall be simple and effective in its construction and operation.

My invention consists in a novel means for feeding and applying glue, in novel means for punching and scoring the blanks, in a novel means for folding or forming the complete box from the blanks, and in other novel features to be hereinafter fully pointed out and described.

In the drawings accompanying and forming part of this specification Figure 1 is a central vertical section on line 1—1 of Fig. 2; Fig. 2 is a plan; Fig. 3 is a horizontal section on line 3—3 of Fig. 1; Fig. 4 is a partial side view; Fig. 5 is a vertical transverse section on line 5—5 of Figs. 2 and 4; Fig. 6 is a partial top view of the glue rolls and actuating mechanism; Fig. 7 is a view showing in detail the actuating means for the cutting off slide; Fig. 8 is a vertical section of the plunger slide; Fig. 9 is a side view of the cutting off slide; Fig. 10 is a partial section of the punching and scoring dies, the forming die and plunger; Fig. 11 is a face view of the punching and scoring die and the forming die; Fig. 12 is a horizontal section of the forming die and plunger; Fig. 13 is a partial section of the forming die showing a different operative position of the parts; Figs. 14 and 15 represent respectively a top and face view of the movable punching and scoring die; Fig. 16 shows a portion of the box at one stage of the folding operation; Fig. 17 is a similar view showing the portion of the box completely folded just prior to pressing the inner surface of the glued end flap against the corner flap; Fig. 18 is a view of a portion of the continuous web showing the manner of punching and scoring and the application of the glue; Fig. 19 shows the complete box; and Figs. 20 and 21 show modifications of the glue applying mechanism.

The reference characters are used in the same sense throughout the drawings and specification.

The machine here illustrated is double and capable of making two boxes of different sizes or a box and its cover simultaneously, many of the parts of the machine serving during a part of a revolution or cycle to perform their function on the box being made at one end of the machine and at another part of the revolution or cycle to perform the same function on the box being made at the other end of the machine, thereby effecting a considerable economy in space, time and cost.

Numeral 1 represents the main frame of the machine which is of the box girder form and supported by the legs 2. Secured to the top of the frame are the brackets 3 having capped bearings 4 formed therein in which operates the main driving or crank shaft 5, having the crank 6 formed thereon, which operates to reciprocate the slide 7, the construction and functions of which will be described hereinafter. At one end of the shaft is mounted the driving pulley 8, which is adapted to be driven by a belt or in any other convenient manner, and it is connected to the shaft by a clutch, the details of which are not shown as they form no part of my present invention. The clutch is operated by the lever 9 connected with the handle 10. At the side of the pulley 8 and secured thereto is a smaller pulley 11 which revolves continuously with the pulley 8 and the pulley 11 is connected by the belt 12 to the pulley 13 which in turn is connected by the belt 14 to the pulley 15, the pulley 13 driving the glue roll 16 at one end of the machine and the pulley 15 driving the glue roll 17 at the other end of the machine. All of the moving parts of the machine except the glue rolls derive their motion from the shaft 5. It will therefore be seen that the glue rolls are kept continuously in motion even when the clutch is thrown out, and the other moving parts of the machine are at rest. The purpose of this feature of my invention is to avoid an uneven distribution of the glue upon the rolls, which occurs when they are allowed to stand at rest partially immersed in the glue. In machines of this kind it frequently happens, from one cause or another, that it is necessary to stop the machine and considerable difficulty has been experienced because of the tendency of the glue to dry quickly and unevenly upon the glue rolls during such time.

The continuous roll or web 18 of paper or other suitable material of which the boxes are to be made is supported as by the shaft 19 or in any convenient manner and is led up over a guide bar 20, over the roll 21, under the roll 22 and between it and the roll 23. The rolls 21 and 22 are mounted respectively in the blocks 23 and 24, which are adapted to slide in the opening 25. A spring 26 presses the rolls together, the rolls 23 being mounted on the shaft 27 journaled in the frame 1. The rolls 23 are fixed to the shaft 27 and the gear 28 is also fixed to said shaft outside of said frame and meshes with the gear 29 on the shaft 30. At the opposite end of the shaft 30 is secured the radially grooved disk 31 and a pin 32 secured to the gear wheel 33 mounted on the shaft 34 operates in the grooves of the disk 31 to give the shaft 30 and therefore the feeding rolls 23 an intermittent rotary motion. The gear wheel 33 meshes with the gear 35 on the main shaft 5. The relation of the connections between the shaft 27 and the shaft 5 and the size of the feed rolls 23 are such that the web 18 is fed the length of one blank for each revolution.

The web 18 is led through the guide 36 up in front of the punching and scoring die 37 and in front of the forming die 2 (s Figs. 1, 2, 4 and 10). In front of the punching and scoring die the notches 39 (see Fig. 18) which separate the corner flaps 40 from the end flaps 41, are punched out and the scores or creases 42 on which the corner flaps are bent and the scores or creases 43 and 44 on which the end flaps 41 and side flaps 45 respectively are bent, are formed, as will be more fully hereinafter explained.

The glued surfaces or spots 46 on the end flaps are applied as the web passes under the roll 22. This is accomplished as follows: The glue rolls 17 are of the width required for the glued surfaces 46. They are mounted on the shaft 47 which revolves in the bearings 48. These bearings are slidably mounted in vertical guides 49 in the glue basin 50. Springs 51 mounted in the guides 49 engage the tops of the bearings 48 and tend to keep the bearings in their lower position. The sliding pins 52 in the end webs of the glue basin project a short distance below the bottom of the basin and engage the bearings 48 at their upper ends. When the bearings are in their lower position the glue rolls 17 revolve clear of the web 18 and they are raised into contact with the web by means of the levers 53, which are secured to the shaft 54 mounted in the frame or legs of the machine and adapted to engage the pins 52. The levers 53 are rocked by means of the cams 55 secured to the end of the shaft 34, the levers 56 being secured to the ends of the shaft 54 and carrying cam rollers 59 at their upper ends which engage the cams 55. The cam rollers are kept in contact with the cam by means of a spring 57. I prefer to make the cams 55 of two similar parts having slotted holes 58 by means of which they may be bolted together in different relations, and the cam rollers 59 are made long enough to span both parts. By this means it is possible to adjust within certain limits the length of the glued surface on the web. When the low part of the cam is opposite the cam roller the spring 57 will raise the glue rolls into contact with the web as will be readily understood. One end of the shaft 47 projects outside of the glue basin 50 and has secured thereto a ratchet 60. This ratchet is engaged by a pawl 61 mounted on the shaft 62, the shaft 62 being journaled in the bracket 63 secured to the frame. The shaft 62 is kept continuously revolving by means of the belt 14 at one end or the belt 12 at the other end of the machine. By means of this arrangement the glue rolls, the lower edges of which dip into the glue, are kept continuously revolving. In the intermittent feeding of the web by means of the radially grooved wheels 31 on the shaft 30 and the pin 32 in the gear wheel 33 above described, the web starts slowly and gradually increases its speed and then gradually slows down again toward the end of its movement and the speed of the periphery of the glue rolls 17 is arranged to be about the same as that of the web when the glue roll first makes contact with the web. Then as the speed of the web increases the ratchet and pawl connection between the shaft 62 and the shaft 47 permits the web to rotate the glue rolls more rapidly than the shaft 62 without causing any slipping between the glue roll and the web or any strain upon the web.

The provision for keeping the glue rolls continuously revolving when the machine is temporarily stopped has already been explained. If, however, the machine should happen to stop with the glue roll in contact with the web the continuous revolution of the glue roll would be interfered with or would result in difficulties which are obvious. To avoid this contingency I provide means for lowering the glue rolls permanently out of engagement with the web whenever the machine has stopped. This means consists of a wedge-shaped block 64 secured to the upper end of the rod 65 which itself is secured to the rod 66 having the clutch operating handle 10 secured thereto. When the clutch is thrown out, the wedge-shaped block 64 is forced between the cam levers 56 holding them, against the action of the spring 57, in their outer position and thereby preventing the glue roll 17 from being raised by the action of the cam. It will therefore be seen that no matter in what position the machine is stopped when the driving clutch is thrown out of engagement, as long as the pulley or driving wheel 8 continues to revolve the glue rolls 17 will continue to revolve free and clear of the web.

The glue basin 50 is provided with extensions 67 which rest upon the supports 68 in the frame, and the shaft 62 being mounted in bracket secured to the frame while the shaft 47, which carries the glue rolls, being mounted in the glue basin, this construction permits the glue basin with the glue rolls to be withdrawn at any time for the purpose of cleaning or renewing the glue supply without disconnecting any parts or even without the necessity of stopping the machine.

The punching and scoring of the blank is accomplished by the movable die 70 coöperating with the stationary die 37, above referred to, and the folding or forming is accomplished by the movable plunger 71 coöperating with the stationary forming die 38 above referred to. The punching and scoring movable die 70 and the plunger 71 are both secured to the reciprocating slide 7 above referred to, which is reciprocated back and forth horizontally by means of the crank 6 on the shaft 5, the sliding blocks 73 operating in the vertical guides 74 of the slide 7 in a manner which is well understood.

The stationary punching and scoring die 37 is secured to the forming die 38 which latter is secured to the bracket 75. The bracket 75 rests upon and is secured to the frame or bed 1 by the bolts 76 and it is adjusted and held in position longitudinally by the adjusting screw 77. The stationary punching and scoring die 37 comprises two parallel pieces 78 and 79, the central member 80, the scoring blades 81 and the stripper 82. The movable punching and scoring die 70 which coöperates with the stationary die above referred to, is secured to the reciprocating slide 7 and comprises the die block 83, the four punching blades 84, the corner flap scoring blades 85, the end flap scoring blades 86, the retaining blocks 87, the side strippers 88, and the central stripper 89. The three parts 78, 79 and 80 of the stationary die are made of hardened steel the top edge of the upper side piece 78 forming a cutting edge for the shearing blade, which severs the blank from the end of the web. The recesses 90 formed between the adjacent ends of the pieces 78, 79 and 80 coöperate with the punches 84 to punch out the slots or notches 39 in the blank to form the end and corner flaps.

Vertical grooves 91 are formed on the side pieces 78 and 79, which coöperate with the blades 85 of the movable die to form creases in the blank on which the corner flaps are bent, and the central piece 80 of the stationary die is provided with grooves 92 which coöperate with the blades 86 of the movable die to form the crease or score on which the end flaps are bent. It will be observed that the corner flap grooves 91 are spaced closer than or within the side flap grooves 92, the purpose of this being to have the corner flaps bent up inside of the end flaps as will be more fully hereinafter explained. At the inner ends of the slots or openings 90 in the stationary punching and scoring die 37, I provide small square pieces 93 to form the cutting edge for the end of the slot and the blades 81 are inserted in a groove or space between these pieces. These blades project a slight distance only above the face of the die and are adjusted by means of the screws 94, and they coöperate with the flat surface of the die block 83 to cut slightly into the web to form the longitudinal scores for the bending of the side flaps. The stripper 82 is made of thin sheet steel and its edges project above the blades 81 and the strippers 88 and 89 of the movable die are also made of sheet steel and their ends project beyond the face of the cutting punches 84, so that when a blank is punched and scored by the dies, as the movable die recedes the blank will be freed from both dies.

The reciprocating slide 7 is provided with the projections 95 at its sides which form guides for the cutter slide 96. The cutter slide carries the cutter blades 97 which coöperate with the upper outer edge of the piece 78 of the stationary die 37 to shear off or sever the blank after it has been punched and scored. The cutting edge of the cutter blade 97 is made concave (see Figs. 2 and 12) so that it shears the outer edges of the web before the central part thereof. This slide is actuated by the cams or lugs 98 secured to the main shaft 5, which coöperate with the blocks 99 secured to the slide in the central opening 100 thereof (see Figs. 7 and 9 for instance). The slide 96 is provided with bores 101 in which operate the plungers 102 which are pressed outwardly by the springs 103. The ends of the plungers 102 are adapted to engage the inwardly projecting end of the bearing 4. As the cam 98 forces the slide 96 in one direction the spring behind the plunger on the opposite side of the shaft is compressed and when the cam passes out of engagement with the lug 99 the spring immediately returns the slide to its central position, as will be readily understood by the drawing.

Secured to the slide 7 above the punching and scoring die 70 is the forming plunger 71 above referred to. This plunger has an end of rectangular shape substantially identical with the shape of the bottom of the inside of the box, and coöperates with the forming die 38 to fold the flaps of the blank and press the glued surfaces together to complete the formation of the box. The forming die 38 has a stationary lower side 105 and a normally stationary upper side 106 spaced apart substantially the width of the outside of the box. The upper side is mounted on the studs 107 and is held down by the springs 108 so that in case, from imperfection in the web of which the boxes are formed, or improper folding, an undue strain is brought upon the die, said side will yield and thus prevent injury to the machine. At the corners of the opening in the forming die are the stationary flap turning projections 109. These are spaced apart vertically the same distance as the upper and lower sides 105 and 106, and they are spaced apart transversely or horizontally a distance substantially equal to the outside length of the box, and they project out in front of the face of the sides 105 and 106 substantially flush with the face of the stationary punching and scoring die. At the ends of the opening in the forming die are mounted the end flap turning blocks 110. These blocks are provided with tongues 111 inclined to the axis of the die and received in grooves in the body of the die. They are provided with recesses 112 and a hole 113 is formed in the die body so that a spring 114 held in place by a screw 115 engages said end flap turning members and tends to force them outwardly from the face of the die, their movement being limited by the washer 116 secured by a screw 117. Their outer faces 118 are substantially flush with the corner flap turning projections 109 and they are provided with beveled edges 119. They are spaced apart transversely a distance somewhat greater than the outside length of the box. Banking screws 120 secured to the movable plunger 71 are adapted to engage the front faces 118 just before the end of the stroke of the plunger and this engagement forces the end flap turning members inwardly so that they press the end flaps against the corner flaps after these have been turned. After the blank has been punched and the cutter blade 97 has advanced sufficiently to partially shear off the blank, the plunger 71 comes in contact with the blank, which at this time occupies a position with its corner flaps over the projections 109, and its end flaps over the blocks 110, and the plunger 71 advances a distance sufficient to slightly turn the corner flaps and slightly bend the end flaps before the blank is completely severed. Then owing to the fact that the end flap turning blocks 110 are spaced wider apart than the corner flap projections 109 and also owing to the bevels 119, the end flaps are carried between the projections 109 and the blank is thus securely held in position at all times. Also owing to the relation just described the corner flaps will be turned more rapidly than the end flaps and fall inside thereof, as indicated in Fig. 18. Then as the plunger advances farther the end flaps and side flaps are turned simultaneously and the lower inside corner 121 of the corner flap will engage the inside of the end flap and be bent by it to the form shown in Fig. 19. The corner will describe an arc indicated by the line 122 Fig. 18 which is on the glued surface of the end flap, but as the corner only comes in contact with the glued surface there is no tendency to stick or impede the bending or interfere with the perfect formation of the box. After the flaps have been turned up as indicated in Fig. 19, the continuous movement of the plunger causes the studs 120 to engage the surface 118 of the end flap turning blocks and carry them inwardly and thereby press the end flaps and corner flaps securely together against the plunger. It will be observed that while the flaps are being pressed together as described, the end flap turning members 110 and the plunger 71 are moving in the same direction and at the same rate so that there is no slipping of the flaps upon either the members 110 or the plunger 71 and therefore no tendency to tear or distort the box, and that as the plunger begins to withdraw the members 110 will move with it and carry the box backward slightly until it is completely freed from the pressure. It will also be observed that all the parts of the folding die 38 are stationary while the blank is being folded. The corner flap turning members 109 and the side flap turning edges 105 and 106 remain stationary throughout the entire operation and the end flap turning blocks 110 remain stationary during the folding operation and are then moved only for the purpose of pressing the glued surfaces together and so far as folding is concerned, may be made stationary, in which case some other approved form of pressing the glued surfaces together may be employed.

The two ends of the machine are constructed alike except that the direction of rotation of the feed rolls and the glue roll at the left hand end of the machine is the reverse of that at the right. The glue roll 17 is given a direction of rotation the reverse of the glue roll 16 by twisting the belt 14 and the feed rolls 23 at the left hand end of the machine (see Figs. 1 and 3) are given a reverse direction of rotation by means of the intermediate gear 123, which connects the gear 124 with the gear 29.

In the modified form of the glue mechanism shown in Fig. 20 the rolls 22 and 23 are mounted in bearings which are laterally movable and the glue rolls 17 are mounted in bearings which are fixed in the glue basin 125. The glue basin has a rib 126 which rocks on its support 127. The lever 128 operated by the cam 55 engages the lug 129 on the glue basin and raises the glue roll at the proper intervals into contact with the web.

In the modification of the glue mechanism shown in Fig. 21 the glue roll revolves about a fixed axis and the rolls 21 and 22 are mounted in a rocking frame 129, which is operated by the cam 55 through the levers 130 and 131 fixed to the shaft 132 and connected by a link 133 to the arm 134 of the frame 129.

In all three forms of the glue applying mechanism the glue roll has a continuous cylindrical periphery and is adapted to be kept in continuous rotation so that the same glue rolls may be employed for boxes of various sizes and forms and an even distribution of the glue is attained.

Having thus described my invention, what I claim is:

1. In a paper box machine the combination with a frame, of a pair of vertical oppositely disposed punching and scoring dies secured to said frame, a pair of vertical oppositely disposed forming dies above said punching and scoring dies, a reciprocating slide slidably mounted in said frame having punching, scoring and forming members secured to each of its ends and adapted to register with said punching, scoring and forming dies respectively, a crank and crank-shaft mounted in said frame, connections between said crank and said slide, a shearing blade slide, a shearing blade secured to each end of said slide adapted to engage the upper edges respectively of said punching and scoring dies.

2. In a box machine the combination with a frame having a notching die and forming die secured thereto, of a reciprocating slide mounted on said frame having a cutting punch and a forming punch secured thereto in operative relation with said notching die and said forming die respectively, a shearing blade between said cutting punch and said forming punch, a slide on which said blade is mounted, and means for reciprocating the same independently of the reciprocation of said first named slide.

3. In a box machine the combination with a feeding mechanism adapted to feed a continuous web at intervals, a blank length at a time, of a notching die and a forming die having their centers spaced apart a blank length, a cutting punch and a forming punch adapted to operate with said notching die and said forming die respectively, said notching die and cutting punch and said forming die and forming punch being adapted to cut box blanks with end flaps, side flaps and corner flaps and to fold the same in said die, a reciprocating slide to which said cutting punch and said forming punch are secured and a pressure slide mounted in said forming die actuated by said slide and adapted to engage the outside of the end flap and press the same against the corner flap between it and said forming punch.

4. In a box machine the combination with a frame, of a notching die and a forming die secured to said frame, a slide mounted in said frame, a cutting punch and a forming punch secured to said frame and adapted to operate respectively in said notching die and said forming die, a crank and crank shaft mounted in said frame, connection between said crank and said slide, a shear blade and slide connected thereto mounted on said first named slide and a cam on said crank shaft adapted to operate said second named slide.

5. In a box machine the combination with a reciprocating slide of a forming plunger secured to said slide, a forming die adapted to be entered by said plunger, said die having a movable side piece adapted to be moved inwardly toward the side of said plunger by said reciprocating slide.

6. In a box machine the combination with a frame, of a forming die secured thereto having an opening therein adapted to receive a folded box blank, one of the sides of said die being slidably mounted in a guide inclined to the axis of the die.

7. In a box machine the combination with a frame, of a forming die secured thereto having an opening therein adapted to receive a folded box-blank, one of the sides of said die being slidably mounted in a guide inclined to the axis of the die, a reciprocating slide mounted on said frame, a forming plunger secured thereto and adapted to enter said die, and an adjustable projection on said slide adapted to engage the movable side of said die.

8. A quadrilateral die for box machines having two fixed opposite parallel sides, and two relatively movable opposite parallel sides normally standing apart a distance somewhat greater than the length of the box upon which they are designed to operate and adapted to be moved inwardly and forwardly against the folded ends of a box.

9. A quadrilateral forming die for box machines having two stationary oppositely disposed sides, and two movable oppositely disposed sides, in combination with a reciprocating plunger adapted to force a box blank into said die, the flaps of said blank being turned over against said plunger by contacting said fixed and movable sides, and means moving said movable sides inwardly against said folded flaps and forwardly at the speed of the plunger while the plunger is in the die.

10. In a box machine the combination with feed rolls adapted to be driven intermittently to give an intermittent movement to a continuous web, of a continuously driven shaft, a glue roll mounted on said shaft, means for moving said glue roll into and out of contact with said web, and connections between said continuously driven shaft and said glue roll whereby the glue roll is given a constant speed when not in contact with said web, and permitting said web by its contact with said glue roll to rotate the roll faster than said shaft.

11. In a box machine the combination with an intermittent feeding mechanism for a continuous web, of a glue roll rotatably mounted, means for moving said glue roll into and out of contact with the continuous web, a continuously driven shaft mounted co-axially with said glue roll, and ratchet and pawl connections between said shaft and said glue roll.

12. In a box machine the combination with a feeding mechanism for the continuous web and means for actuating the same, of a glue roll rotating means for causing said glue roll to rotate continuously, means for bringing said glue roll into contact with the web at pre-determined points, and manually operated means independent of said rotating means and said actuating means for preventing said glue roll from contacting the continuous web.

13. In a box machine the combination with a rectangular plunger of a die having two stationary sides and two relatively movable sides adapted to receive and fold a blank, means holding said relatively movable sides stationary during the folding of the blank, and means causing them to advance with and to approach and press upon the blank after it has been folded.

14. In a machine for forming boxes from blanks having side, end and corner flaps, the combination with a reciprocating plunger of a die having a rectangular opening bounded by stationary side-flap engaging sides having corner-flap engaging lugs immovably secured thereto projecting above said sides, and end-flap engaging ends.

15. In a machine for forming boxes from blanks having side, end and corner flaps, the combination with a reciprocating plunger of a die having a rectangular opening bounded by stationary side-flap engaging sides having stationary corner-flap engaging lugs extending above said sides and in such proximity thereto as to retain engagement with the corner flaps during the bending of the side flaps, and end flap engaging ends substantially flush with said corner-flap engaging lugs.

16. In a machine for forming boxes from blanks having side, end and corner flaps, the combination with a reciprocating plunger, of a die having a rectangular opening bounded by stationary side-flap engaging sides having stationary corner-flap engaging lugs secured thereto projecting above said sides, and end flap engaging ends flush with the corner flap engaging lugs, beveled outwardly on their inner edges.

17. In a machine for forming boxes from blanks having side, end and corner flaps, the combination with a plunger, of a die having sides and ends adapted to engage the side flaps and end flaps respectively, and stationary corner flap turning lugs or projections immovably secured thereto raised above the surface of the sides of the die and spaced apart transversely not less than the width of the end flaps of the blank.

18. In a machine for forming boxes from a continuous web, the combination with a feeding mechanism and a cutting off mechanism adapted to shear a blank from the end of the continuous web progressively from opposite sides of the web toward the center, of a folding or forming mechanism adapted to start the folding of the blank before it is completely severed.

19. In a machine for forming boxes from a continuous web, the combination with a feeding mechanism, a punching and scoring die and a cutting off mechanism adapted to shear a blank from the end of the web after it has been punched and scored, of a folding die and a plunger adapted to bring the blank into contact therewith and partially bend the same before it is completely severed by said cutting off mechanism.

20. In a machine for forming boxes from blanks having end flaps, side flaps and corner flaps joined to said side flaps, the combination with a reciprocating plunger of a die having stationary side-flap turning edges, stationary corner-flap turning projections extending in front of said edges and spaced apart transversely a distance adapted to receive and guide the end flaps of the blank during the initial bending of the corner flaps and end flap turning edges spaced apart a greater distance than said corner flap turning projections.

In testimony whereof, I have signed my name to this specification in the presence of two subscribing witnesses.

JULIAN A. GILES.

Witnesses:
Wm. H. Schummrick,
Sam H. Lessey.